United States Patent [19]

Stockman

[11] 4,028,595
[45] * June 7, 1977

[54] MULTI-VOLTAGE CAPACITOR SECTION

[75] Inventor: Robert M. Stockman, Brookfield Center, Conn.

[73] Assignee: American Radionic Co., Inc., Danbury, Conn.

[ * ] Notice: The portion of the term of this patent subsequent to Nov. 18, 1992, has been disclaimed.

[22] Filed: Dec. 2, 1975

[21] Appl. No.: 637,091

[52] U.S. Cl. .............................. 361/328; 29/25.42; 361/321
[51] Int. Cl.$^2$ ........................................ H01G 4/38
[58] Field of Search ........... 317/260, 242; 29/25.42

[56] References Cited

UNITED STATES PATENTS

| 1,658,501 | 2/1928 | Valle | 317/260 |
| 1,795,411 | 3/1931 | Sprague | 317/260 |
| 3,159,776 | 12/1964 | Metcalf | 317/242 |
| 3,892,023 | 7/1975 | Warmont | 317/260 |
| 3,921,041 | 11/1975 | Stockman | 317/260 |

OTHER PUBLICATIONS

Dummer Fixed & Variable Capacitors, McGraw-Hill, NY, pp. 89 & 90.

Primary Examiner—E. A. Goldberg
Attorney, Agent, or Firm—Buckles and Bramblett

[57] ABSTRACT

A multiple capacitor and method for making the same. A single capacitor section is wound in the usual manner from two metallized films. After the winding has progressed through the proper number of turns for one of the capacitors, the metallized layer is removed from the surface of at least one film over a selected distance. An insulated sheet having a length sufficient to encircle the capacitor at least once is inserted between the film layers to extend beyond at least one end of the wound cylinder. The ends of two additional dielectric strips are inserted into the capacitor winding between the metallized films. Winding is then completed and each end of the wound section is metal plated. Leads are then attached to the ends of the capacitor section, resulting in a plurality of capacitors having different voltage ratings but wound within a single capacitor section.

6 Claims, 2 Drawing Figures

MULTI-VOLTAGE CAPACITOR SECTION

BACKGROUND OF THE INVENTION

In U.S. Pat. No. 3,921,041, issued Nov. 18, 1975 for Dual Capacitor, and assigned to the same assignee as the present invention, there is disclosed a dual capacitor and a method for making the same. The disclosure of such patent is incorporated by reference herein.

In the practice of the patented invention, a capacitor section is wound in the usual manner from a pair of metallized dielectric films. A portion of the metallized layer is then removed from at least one of the films. A non-conductive sheet is then inserted which extends from one end of the wound section to separate the two capacitors being formed and winding is continued, resulting in two capacitors wound in a single section. The patented article comprises multiple capacitors wound in a very compact configuration. Furthermore as disclosed in such patent, the capacitances of the two capacitors may vary depending upon the area of metallized foil which each contains. However, the voltage ratings of the dual capacitors are the same because they utilize the same dielectric film.

Under certain circumstances, it would be desirable for the two capacitors to have different voltage ratings while retaining the advantages of the compact configuration. Accordingly, it is a primary object of the present invention to produce a plurality of capacitors wound in a single section but having different voltage ratings. Other objects, features and advantages will be apparent from the following description and appended claims. The closest prior art known to Applicant, other than the above-referenced patent, is U.S. Pat. No. 3,892,023 issued July 1, 1975 to Warmont. The Warmont patent discloses two capacitors wound on a single section but discloses no means of providing for different voltage ratings of the included capacitors.

SUMMARY OF THE INVENTION

A capacitor section which comprises first and second dielectric strips wound together in cylindrical form. First and second conductive plates are separated by the first and second dielectric strips and at least one of the plates is interrupted across its length to thereby form at least two electrical capacitors. Supplemental third and fourth dielectric strips are inserted adjacent the first and second dielectric strips in one of the capacitors to thereby provide two capacitors having different voltage ratings.

DESCRIPTION OF THE PREFERRED EMBODIMENT

Figures 1, 2, 3:
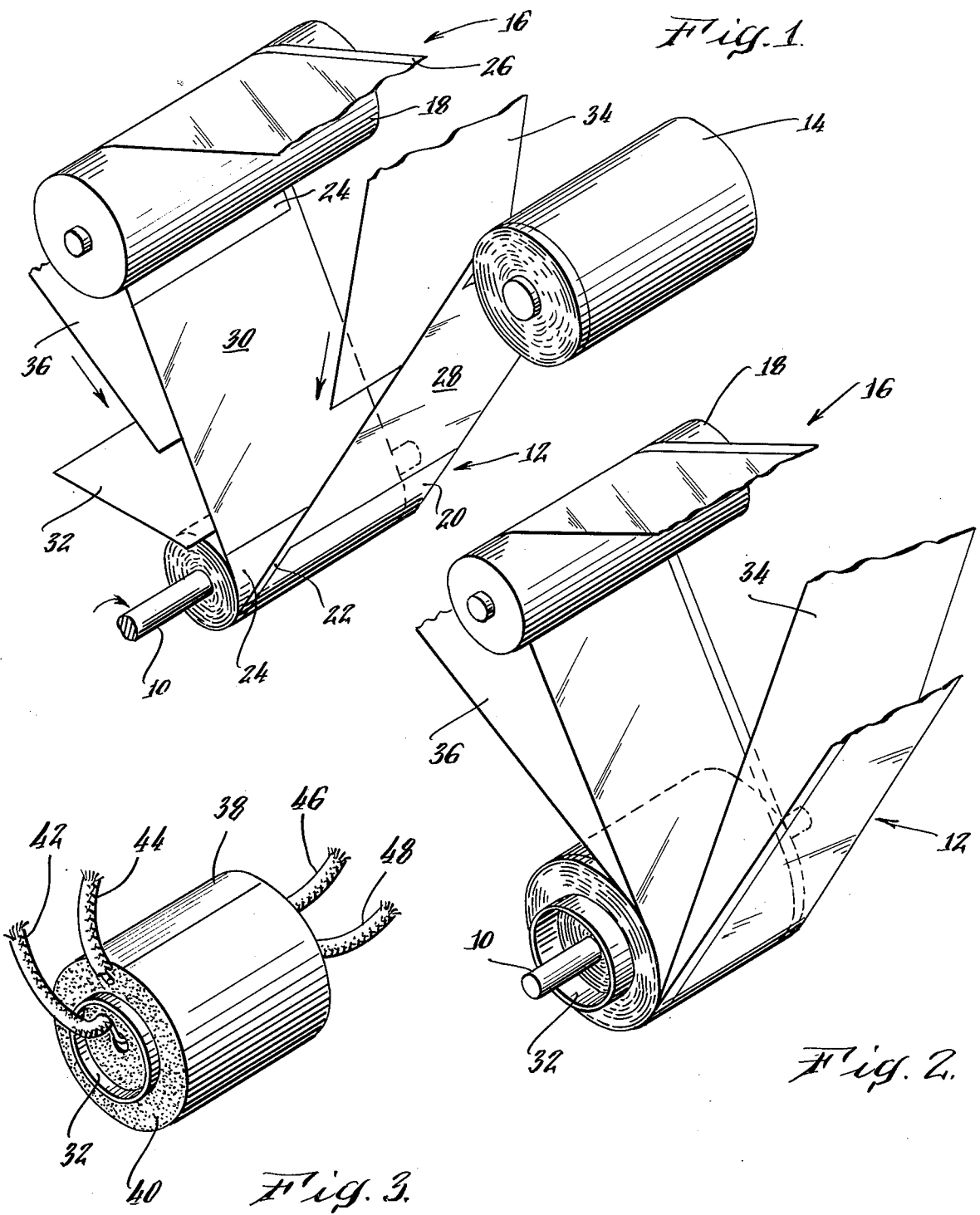
FIG. 1 is a perspective view of a capacitor section in accordance with this invention in the process of being wound.
FIG. 2 is a perspective view similar to that of FIG. 1, illustrating a further step in the winding of the capacitor section.
FIG. 3 is a perspective view of a completed capacitor in accordance with this invention.

There is illustrated in FIG. 1 a capacitor section in accordance with this invention being wound in a conventional winding machine having a rotating spindle 10. A metallized dielectric film 12 is fed from a first supply roll 14 and a second metallized dielectric film 16 is fed from a second supply roll (not shown). One or more of the films may pass over a cylindrical copper electrode 18 in accordance with the teachings of applicant's prior patent. The film 12 carries on its near surface, as viewed in FIG. 1, a thin metallic layer 20 which extends to the right edge of the film but terminates short of the left edge leaving a strip of non-metallized dielectric 22 therealong. The film 16 similarly carries a thin metal layer 24 on its near surface as viewed in FIG. 1, which extends to the left edge of the film but terminates short of the right edge to leave a strip of non-metallized dielectric 26 therealong.

In the illustrated embodiment of this invention, two completely separate capacitors are wound in a single section. Accordingly, the metallic film is removed from both strips to leave non-conductive dielectric regions 28, 30 interrupting the respective metal layers 20, 24 of the films. This removal may be accomplished in the manner taught in the aforementioned U.S. Pat. No. 3,921,041 or by any other suitable method. Furthermore, the invention is not restricted to the use of metallized films and may be utilized with a film and foil capacitor wherein a gap between the foil ends would serve to define the dielectric regions 28, 30. It will also be apparent that only one conductive plate may be interrupted, resulting in a common plate construction as disclosed in the referenced patent. A non-conductive sheet 32 is inserted into the winding so as to protrude from at least one end and encircle the capacitor at least once as disclosed in the referenced patent.

In order to provide for different voltage ratings of the dual capacitors, there are inserted into the windings the ends of supplemental dielectric strips 34, 36 from suitable supply rolls (not shown). The insulating and dielectric qualities of the strips 34, 36 are chosen so that, when added to the similar quantities of the metallized strips, the desired voltage rating is obtained. Thereafter, winding is continued as illustrated in FIG. 2 and terminated in the usual manner with the strips 12, 16, 34 and 36 being cut and the completed section wrapped with a suitable tape 38 (FIG. 3).

The cylindrical capacitor section is metal plated in the conventional manner employed for attaching leads. Thereafter, the barrier(s) formed by sheet 32 is trimmed. A copper-solder layer 40 is applied to each end of the capacitor to which suitable leads 42, 44, 46, 48 may be soldered.

It is believed that the many advantages of this invention will now be apparent to those skilled in the art. There has been provided a simple but effective method for forming multiple capacitors of differing voltage ratings in a very compact space. It will also be apparent that a number of variations and modifications may be made in this invention without departing from its spirit and scope. For example, the invention is not limited to the formation of dual capacitors in any single section but any number of such capacitors may be provided. Furthermore, the supplemental dielectric strips may be inserted for any one or more of the capacitors so formed, resulting in the formation of a single wound section which includes a plurality of capacitors having any desired capacitance and voltage ratings. Accordingly, the foregoing description is to be construed as illustrative only, rather than limiting. This invention is limited only by the scope of the following claims.

I claim:

1. A capacitor section comprising: first and second dielectric strips wound together in cylindrical form;

first and second conductive plates separated by said first and second dielectric strips, at least one of said plates being interrupted across its length to thereby form at least two electrical capacitors; a non-conductive sheet inserted between said strips and extending outwardly from a first end of said section adjacent said interrupted length to form a circular barrier separating the interrupted portions of said one plate; and supplemental third and fourth dielectric strips adjacent said first and second dielectric strips in one of said capacitors whereby said two capacitors have different voltage ratings.

2. The capacitor section of claim 1 wherein both of said plates are interrupted to form completely separate capacitors.

3. The capacitor section of claim 1 wherein said first and second conductive plates comprise metallized layers on said first and second dielectric strips, respectively.

4. The capacitor section of claim 3 wherein both of said plates are interrupted to form completely separate capacitors.

5. The method of making a dual metallized film capacitor section which comprises: providing a supply of a first dielectric film strip metallized on one side thereof; providing a supply of a second dielectric film strip metallized on one side thereof; winding said first and second strips in substantially cylindrical form with the non-metallized side of each strip in contact with the metallized side of the other strip, the metallized edge of said first strip being exposed at one end of said cylindrical form and the metallized edge of said second strip being exposed at the other end of said cylindrical form; removing the metallized layer form at least said first strip over a region intermediate the ends of said first strip to thereby form first and second capacitors including respective first plates separated by said region; inserting between said region and said second strip a sheet of insulating material positioned to extend outwardly from said one end of said cylindrical form and a length sufficient to encircle the circumference of said form at said region at least once; and inserting and winding supplemental dielectric strips into said cylindrical form adjacent the first and second dielectric strips of one of said first and second capacitors.

6. The method of making a dual capacitor section which comprises: providing supplies of first and second dielectric strips; providing supplies of first and second metallic strips; winding said first and second dielectric strips interleaved with said first and second metallic strips in substantially cylindrical form; interrupting said first metallic strip intermediate its ends to thereby form with said second metallic strip first and second capacitors; inserting between said first and second dielectric strips adjacent the interrupted region of said first metallic strip a sheet of insulating material positioned to extend outwardly from one end of said cylindrical form and of a length sufficient to encircle the circumference of said form at said region at least once; and inserting and winding supplemental dielectric strips into said cylindrical form adjacent the first and second dielectric strips of one of said first and second capacitors to thereby vary the voltage ratings between said first and second capacitors.

* * * * *

UNITED STATES PATENT OFFICE
CERTIFICATE OF CORRECTION

Patent No. 4,028,595      Dated June 7, 1977

Inventor(s) Robert M. Stockman

It is certified that error appears in the above-identified patent and that said Letters Patent are hereby corrected as shown below:

Column 2, line 36, delete "quantities" and insert therefor --qualities--. Column 4, line 1, delete "form" and insert therefor --from--.

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*